(12) United States Patent
Domaradzki et al.

(10) Patent No.: US 10,503,317 B2
(45) Date of Patent: Dec. 10, 2019

(54) TURBULENCE RESISTANT TOUCH SYSTEM

(71) Applicant: The Boeing Company, Chicago, IL (US)

(72) Inventors: Lukasz Domaradzki, Gdynia (PL); Brian Azcuenaga, Castle Rock, CO (US); Samantha Schwartz, Castle Pines, CO (US); Mariusz Nawotczynski, Gdansk (PL); Antonio Puentes, Düsseldorf (DE)

(73) Assignee: THE BOEING COMPANY, Chicago, IL (US)

( * ) Notice: Subject to any disclaimer, the term of this patent is extended or adjusted under 35 U.S.C. 154(b) by 155 days.

(21) Appl. No.: 15/019,153

(22) Filed: Feb. 9, 2016

(65) Prior Publication Data

US 2017/0228095 A1    Aug. 10, 2017

(51) Int. Cl.
*G06F 3/041* (2006.01)
*G06F 3/048* (2013.01)
*G06F 3/0488* (2013.01)
*G06F 3/01* (2006.01)
*G06F 3/0481* (2013.01)

(52) U.S. Cl.
CPC ............ *G06F 3/0418* (2013.01); *G06F 3/014* (2013.01); *G06F 3/048* (2013.01); *G06F 3/0481* (2013.01); *G06F 3/0488* (2013.01)

(58) Field of Classification Search
CPC ......... G06F 2203/04101; G06F 3/0488; G06F 3/0418; G06F 1/1626; G06F 1/1643; G06F 1/1694; G06F 3/0481
See application file for complete search history.

(56) References Cited

U.S. PATENT DOCUMENTS 8,825,234 B2    9/2014 Williams et al.
2006/0214926 A1* 9/2006 Kolmykov-Zotov ........................
                                                    G06F 3/04842
                                                    345/179
2007/0236475 A1   10/2007 Wherry
(Continued)

FOREIGN PATENT DOCUMENTS

EP    2555105 A2    2/2013
EP    2667295 A2   11/2013
EP    2818994 A1   12/2014

OTHER PUBLICATIONS

The European Search Report for Application No. 16199059.3 dated Aug. 8, 2017.

*Primary Examiner* — Sepehr Azari
(74) *Attorney, Agent, or Firm* — Patterson + Sheridan, LLP

(57) ABSTRACT

Aspects herein describe a display system that moves at least a portion of a displayed GUI in response to turbulent motions in a vehicle. In one aspect, the GUI is displayed on a screen that includes an integrated touch sensing region that permits a user to interact with one or more elements in the GUI. However, turbulent motion may cause the user to miss the interactive element or inadvertently touch the wrong element in the GUI. To aid the user to touch the desired portion of the GUI, in one aspect, the display system tracks the movement of a hand or finger of the user to determine its position relative to a screen displaying the GUI and maintains the spatial relationship of the hand or the finger to the GUI during turbulent motions.

20 Claims, 6 Drawing Sheets

(56) References Cited

U.S. PATENT DOCUMENTS

| | | | |
|---|---|---|---|
| 2009/0201246 A1* | 8/2009 | Lee | G06F 1/1626 |
| | | | 345/156 |
| 2011/0007035 A1* | 1/2011 | Shai | G06F 3/014 |
| | | | 345/179 |
| 2011/0078625 A1 | 3/2011 | Mumford et al. | |
| 2013/0314328 A1* | 11/2013 | Singer | G06F 3/0488 |
| | | | 345/173 |
| 2014/0035827 A1* | 2/2014 | Hyde | G06F 1/1694 |
| | | | 345/173 |
| 2014/0062893 A1* | 3/2014 | Kawalkar | G06F 3/0488 |
| | | | 345/173 |
| 2014/0201674 A1 | 7/2014 | Holz | |
| 2014/0240242 A1* | 8/2014 | Kawalkar | G06F 3/0418 |
| | | | 345/173 |

* cited by examiner

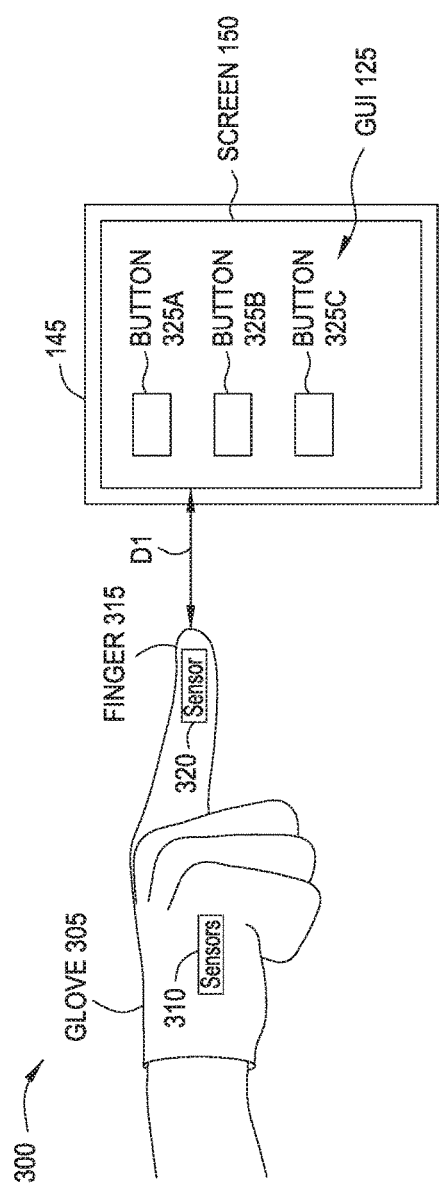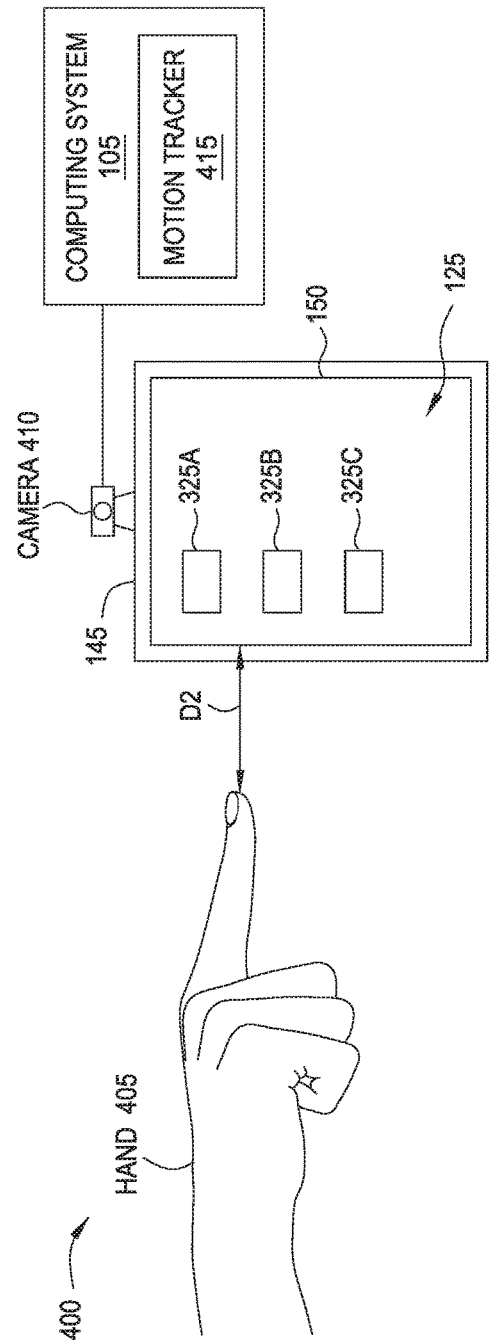

US 10,503,317 B2

TURBULENCE RESISTANT TOUCH SYSTEM

BACKGROUND

The present disclosure generally relates to data processing systems and, in particular, to data processing systems that include touch screen systems.

In an effort to reduce the amount of space needed in a cockpit of an aircraft, different electrical systems may be combined into a single system or share a display. For example, several flight instruments and controls may be combined into a single display and control system for that display. In this manner, less space may be needed for these systems in the cockpit of an aircraft.

Different types of information may be displayed on a using a graphical user interface (GUI). To interact with the GUI, the display can include an integrated touch screen which permits the user to activate or alter interactive elements in the GUI. During certain operating conditions, however, the ability of an operator to use the touch screen may be difficult. For example, touching the correct interactive button or slider during certain maneuvers of the aircraft such as takeoff and landing in the presence of strong accelerations can be difficult. In other examples, conditions such as the weather may also make the use of the touch screen more difficult.

SUMMARY

One aspect described herein is a method that includes displaying a graphical user interface (GUI) on a touch screen and identifying a spatial relationship between a body part of a user and at least a portion of the GUI displayed on the touch screen. The method includes moving, in response to relative motion between the touch screen and the body part, a position of the portion of the GUI within the touch screen to maintain the spatial relationship between the body part and the portion of the GUI.

Another aspect described herein is a display system that includes a touch screen configured to display a GUI and a turbulence detector. The turbulence detector is configured to identify a spatial relationship between a body part of a user and at least a portion of the GUI displayed on the touch screen and move, in response to relative motion between the touch screen and the body part, a position of the portion of the GUI within the touch screen to maintain the spatial relationship between the body part and the portion of the GUI.

Another aspect described herein is computer readable storage medium that includes computer-readable program code embodied therewith. The computer-readable program code executable by one or more computer processors to display a GUI on a touch screen, identify a spatial relationship between a body part of a user and at least a portion of the GUI displayed on the touch screen, and move, in response to relative motion between the touch screen and the body part, a position of the portion of the GUI within the touch screen to maintain the spatial relationship between the user and the portion of the GUI.

BRIEF DESCRIPTION OF THE SEVERAL VIEWS OF THE DRAWINGS

FIG. 3 illustrates a system for tracking the position of a hand relative to a touch screen;

FIG. 4 illustrates a system for tracking the position of a hand relative to a touch screen;

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects herein describe a display system that moves at least a portion of a displayed graphical user interface (GUI) in response to turbulent motions in a vehicle (e.g., an aircraft, boat, automobile, train, spacecraft, etc.). In one aspect, the GUI is displayed on a screen that includes an integrated touch sensing region that permits a user to interact with one or more elements in the GUI (e.g., a button, slider, interactive object, etc.). Using her finger, the user can touch (or hover over) the screen in order to interact with the GUI. However, turbulent motion may cause the user to miss the interactive element or inadvertently touch the wrong element in the GUI.

To help the user touch the desired interactive element in the GUI, in one aspect, the display system tracks the movement of the hand or finger of the user to determine its position relative to the screen displaying the GUI and maintains the spatial relationship of the hand or finger to the screen during turbulent motions. In one aspect, the user wears a glove that includes sensors for determining the location of the hand relative to the screen. Alternatively, the display system may include motion tracking application for tracking the location of the user's hand. When a turbulent motion causes the hand to move in an undesired or unintended manner relative to the screen, the display system adjusts the GUI being displayed such that the spatial relationship between the user and the GUI is maintained. In one aspect, the display system shifts the location of the GUI in the screen such that at least a portion of the GUI remains in a fixed spatial relationship with the finger of the user. Thus, if the user touches the screen soon after the turbulent motion, the user touches the intended location of the GUI rather than an unintended location on the screen.

Figure 1:
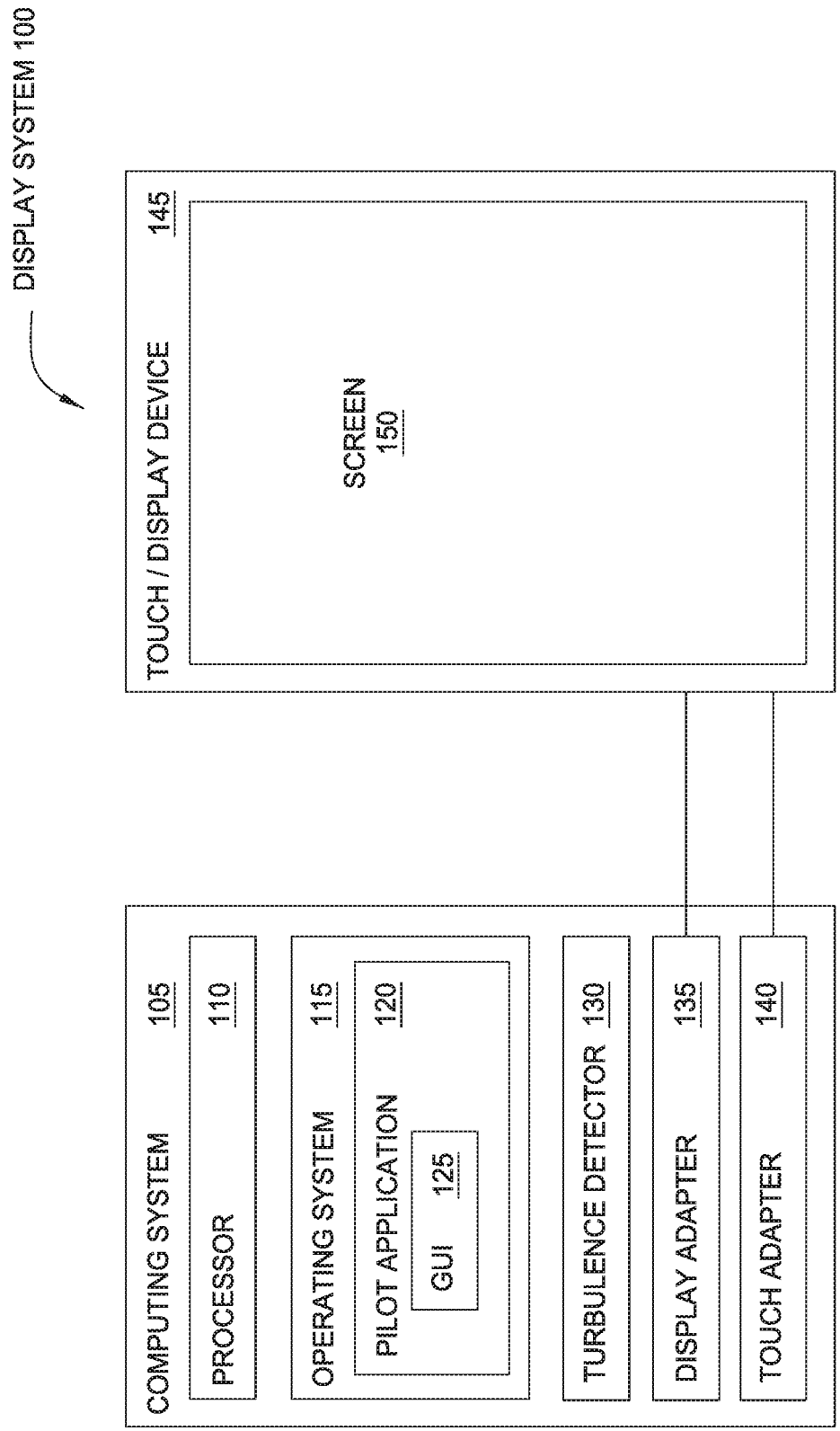
FIG. 1 is a block diagram of a display system with an integrated touch and display screen.

FIG. 1 is a block diagram of a display system 100 with a computing system 105 and an integrated touch and display device 145. The computing system 105 includes a processor 110, operating system 115, turbulence detector 130, display adapter 135, and touch adapter 140. The processor 110 represents one or more processing elements that may include multiple processing cores. The processor 110 can include general purpose processors or application specific integrated circuits (ASICs) for executing instructions received from the operating system 115. The operating system 115 can be any operating system capable of performing the functions described herein. The operating system 115 includes a pilot application 120 which generates a GUI 125 for display on the touch/display device 145.

In one aspect, the pilot application 120 updates the GUI 125 for display on a multi-function display that includes the touch/display device 145. Generally, the GUI 125 may provide a user with information such as the altitude of the plane, tilt, speed of the vehicle, location, status of control systems, fuel levels, and the like. Moreover, the GUI 125 includes interactive elements that the user can activate or move using the touch/display device 145. For example, a screen 150 used to display the GUI 125 also defines a sensing region that permits the device 145 to receive user input. When a user touches (or hovers over) an interactive element in the GUI 125, the touch/display device 145 can detect the position of the user's finger and alert the pilot application 120. In response, the pilot application 120 can alter the GUI 125 or send control signals to other systems in the vehicle which change a parameter of the vehicle.

Although FIG. 1 illustrates a pilot application 120 which outputs information useful to a pilot for operating a vehicle such as an airplane or boat, other applications may be used such as a navigation application which displays an interactive GUI in a car for providing directions to the driver. In another example, the computing system 105 may include a media application which displays a GUI for a passenger in a plane to select a movie or television show to view. For example, the touch/display device 145 may be disposed in the back of seat or a tablet or smartphone held by the user in the vehicle. All of these non-limiting examples are applications where the techniques described below can be used to prevent the user from accidentally touching an undesired portion of the screen during turbulent motions.

The turbulence detector 130 detects turbulent motion, and in response, adjusts the manner in which the GUI 125 is displayed in the touch/display device 145. As used herein "turbulent motion" or "turbulence" may include any force on the vehicle and/or user in the vehicle that alters the spatial relationship between the user and the touch/display device 145. Examples of turbulent motion include turbulence in an aircraft, a wheeled vehicle hitting a pothole, accelerations or decelerations (e.g., stopping at a red light or taking off or landing an aircraft), moving over waves, and the like.

The turbulence detector 130 may be communicatively coupled to the pilot application 120 and to the display adapter 135 which is tasked with displaying the GUI 125 on the touch/display device 145. The turbulence detector 130 alters how the display adapter 135 outputs GUI 125 in response to detecting turbulent motions. For example, before a turbulent motion, the finger of the user may be disposed over a particular button displayed in the GUI 125. However, the turbulent motion may force either the finger or the device 145 to move relative to each other so that the finger is no longer disposed over the button. If the user was in the process of touching the button when the turbulent motion occurred, without the techniques described herein, the user may contact a portion of the GUI 125 that does not include the button. As will be described in more detail below, the turbulence detector 130 instructs the display adapter 135 to change how the GUI 125 is displayed on the touch/display device 145 such that the spatial relationship between the finger of the user and the button in the GUI 125 is maintained after the turbulent motion occurs.

In one aspect, the turbulence detector 130 is communicatively coupled to one or more sensors disposed in the plane such as accelerometers, gyroscopes, motion tracking systems, and the like which provide data that can be used to identify turbulent motion. These sensors permit the turbulence detector 130 to determine if the movement of the hand was intended by the user or was because of the turbulent motion. For example, the sensor may permit the turbulence detector 130 to track the finger of the user before the finger touches the screen 150 and determine if the movement of the finger is because of turbulent motion, and if so, adjust the manner in which the GUI 125 is displayed on the device 145.

The touch adapter 140 is coupled to the touch/display device 145 and detects the location of the user's finger or hand (or other body part) when proximate to the sensing region in screen 150. For example, the touch adapter 140 may use resistive or capacitive sensing to identify a location in the screen 150 where the user is currently contacting. In one aspect, the touch adapter 140 reports this location to the turbulence detector 130 or the pilot application 120 which determines whether the user has touched one of the interactive elements in the GUI 125. Put differently, the turbulence detector 130 knows the locations where the interactive elements of the GUI 125 are being displayed and can correlate these locations to the location provided by the touch adapter 140 to determine which one of the interactive elements the user is currently contacting or hovering over.

One advantage of using the turbulence detector 130 to adjust the manner in which the GUI 125 is displayed is that the pilot application 120 does not need to be changed or modified. That is, the turbulence detector 130 (which can be hardware, firmware, software or combinations thereof) can serve as an intermediary between the pilot application 120 and the display adapter 135. Thus, the pilot application 120 does not need to detect turbulent motions and adjust the GUI 125, but rather, this is performed by the turbulence detector 130. Even if multiple different applications use the touch/display device 145 to display GUIs, in one aspect, these applications are not modified in order to perform the techniques described herein. Instead, the pilot application 120 sends the GUI 125 to the turbulence detector 130 which then modifies how the GUI 125 is displayed in response to turbulent motions. Moreover, since the turbulence detector 130 modifies the GUI 125, the turbulence detector 130 contains the information to map locations of user interaction in the sensing region of the touch/display device 145 to locations of the interactive elements in the GUI 125 to determine if the user has contacted one or more of the elements. If so, the turbulence detector 130 can inform the pilot application 120 which interactive element was contacted by the user. Thus, in one aspect, the pilot application 120 functions the same whether the GUI 125 was displayed normally or was altered by the turbulence detector 130 before being displayed.

Figure 2:
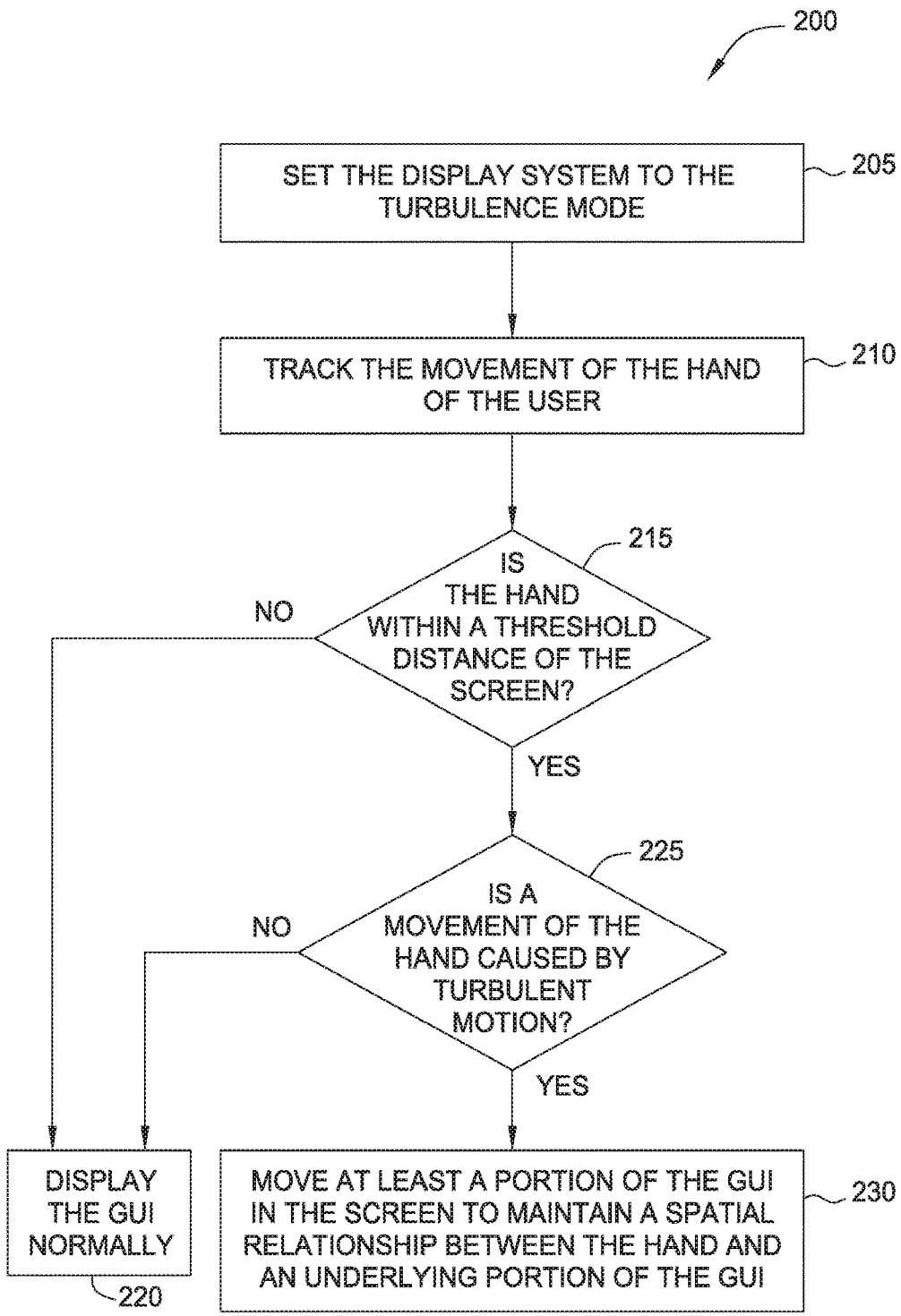
FIG. 2 is a flowchart for adjusting a GUI in response to turbulent motions.

FIG. 2 is a flowchart of a method 200 for adjusting a GUI in response to turbulent motions. The method begins at block 205 where the turbulence detector sets the display system in a turbulence mode. In one aspect, the turbulence detector monitors sensors in the vehicle to determine whether to set the display system in the turbulence mode. For example, the turbulence detector may wait until accelerations reported by the sensors cross a threshold or a certain number of accelerations are measured within a predefined time period before activating the turbulence mode. In one aspect, a user (e.g., pilot or driver) may manually activate the turbulence mode. Once set in the turbulence mode, the turbulence detector begins monitoring the location of the body part of the user (e.g., finger or hand) that interacts with the touch screen as discussed below.

If the turbulence mode is not activated, the turbulence detector may not monitor the user to determine whether user motion is caused by turbulent motion. Putting the display system in the turbulence mode may reduce the likelihood of false positives where the turbulence detector mistakenly interprets user motion which was not caused by turbulent motion as unintended motion. However, in other aspects, the turbulence detector does not wait until the display system is placed in the turbulent mode before attempting to detect movements in the hand or finger of the user caused by turbulent motions.

At block 210, the turbulence detector tracks the movement of the hand or finger of the user. In one aspect, the turbulence detector determines a relative location of the hand to the screen displaying the GUI. In one example, the turbulence detector determines which portion of the GUI is covered by the user's finger relative to a direction perpendicular to the screen. In the manner, the turbulence detector can identify which interactive elements in the GUI the user is most likely trying to activate or contact. Thus, if turbulent motion causes the hand of the user to move, the turbulence detector has already identified the interactive elements the user may be attempting to contact.

FIG. 3 illustrates a system 300 for tracking the position of a hand relative to the touch screen 150 displaying the GUI 125. The system 300 includes a glove 305 worn by the user that includes sensors 310 and 320. The sensors 310 and 320 output data that can be used by the turbulence detector to track the location of the hand as described at block 210 of method 200. For example, the sensors 310 and 320 may be accelerometers, gyroscopes, radio frequency or infrared emitters used for location detection, and the like. The glove 305 may include a wireless transmitter for transmitting the data generated by the sensors 310 and 320 to the turbulence detector which can use the data to track the location of the user's hand or finger.

In one aspect, the turbulence detector uses the data from the sensors 310 and 320 to determine the location of the finger 315 relative to the GUI 125. For example, the turbulence detector determines whether the finger 315 is over one of the buttons 325 in the GUI 125. In one aspect, the turbulence detector determines the location of the finger 315 in 3D space which can be compared to the locations of the buttons 325. Put differently, assuming the location of the buttons 325 is known, the turbulence detector can use the information provided by the sensors 310 and 320 to determine which button 325 the finger 315 is approaching. Although system 300 illustrates using a glove 305 as a wearable device for tracking the hand of the user, in other aspects, the wearable device could be a ring, bracelet, watch, and the like.

FIG. 4 illustrates a system 400 for tracking the position of a hand 405 relative to a touch screen. Unlike in FIG. 3 where the user wears an active device for tracking the hand, system 400 uses a motion tracker 415 to identify the location of the hand relative to the screen 150. That is, system 400 does not require the user to wear any kind of device in order to track the location of the hand 405. Instead, system 400 includes a camera 410 coupled to the computing system 105 which provides updated images to the motion tracker 415. In one aspect, the camera 410 is arranged such that its field of view captures objects (e.g., the hand 405) that approach the screen 150.

The motion tracker 415 processes the images captured by the camera 410 to identify the location of the hand 405 relative to the screen 150. The motion tracker 415 then transmits the location of the hand 405 to the turbulence detector. In this manner, the system 400 can determine if the hand 405 is approaching or is hovering over one of the buttons 325 in the GUI 125. Moreover, to aid in determining the location of the hand 405 relative the screen, the system 400 may include a depth camera which determines the distance from the hand 405 to the camera. Generally, the techniques described herein can use any detection system that provides enough resolution to identify a portion of the GUI 125 that is overlapped by the extended finger of the hand 405 in order to identify a spatial relationship between the user and the GUI 125.

Returning to method 200, at block 215, the turbulence detector determines if the hand (or finger) is within a threshold distance of the screen. In this example, the turbulence detector determines a distance between the hand or finger to the screen. For example, the turbulence detector may not correlate a portion of the GUI to the hand of the user until the user's finger is within a predefined distance from the screen (e.g., an inch or less). Put differently, the turbulence detector may wait until the hand or finger of the user is within an inch from the screen before the detector identifies which portion of the GUI the user is attempting to contact. For example, if the user's hand is more than an inch from the screen, then method 200 proceeds to block 220 where the GUI is displayed normally on the screen.

Both FIGS. 3 and 4 illustrate determining distances D1 and D2 between the screen 150 and the user, which in these examples, is the tip of the extended finger. In one aspect, if the finger is more than an inch away from the screen 150, the turbulence detector does not identify a portion of the GUI 125 overlapped by the finger—i.e., does not identify a spatial relationship between the finger and the GUI 125. For example, the user may not have yet decided which of the three buttons 325 she wants to push. However, when the user moves the finger such that it is within one inch of the screen, the turbulence detector assumes the user has decided which button 325 she wants to push. In response, the turbulence detector determines the location of the screen 150 overlapped by the finger using system 300 or system 400.

In one aspect, the turbulence detector may also monitor a rate at which the user's hand approaches the screen using the systems 300 or 400. For example, if the user is moving her hand towards the screen at a rate equal to or greater than one inch per second, the turbulence detector determines the user has decided which button to push. In response, the turbulence detector identifies the button that the user will push if her current motion continues. That is, the turbulence detector may use the sensor information provided by systems 300 or 400 to determine a current direction of the user's hand, and thus, where the user's finger will contact the screen. In one aspect, the rate at which the user's hand moves may be used as the threshold at block 215 rather than a threshold distance. For example, regardless of the current separation of the user's hand and the screen, the turbulence detector may only proceed to block 225 if the rate at which the hand approaches the screen is greater than one inch per second. Thus, if the finger is only a half of inch away from the screen but stationary, the turbulence detector may not correlate any particular interactive element in the GUI to the location of the finger. Put differently, because the user is not moving her hand, the turbulence detector assumes the user has not yet made up her mind which interactive element to push, and thus, displays the GUI normally even if there is a turbulent motion.

In another aspect, the predefined distance threshold and the rate at which the user is moving her hand may be used in combination at block 215. For example, the turbulence detector may proceed to block 225 only if any portion of the user's hand is within two inches of the screen and the hand is moving in a direction towards the screen at a rate of half an inch per second. Otherwise, the turbulence detector displays the GUI normally.

Assuming a body part of the user is within the threshold distance from the screen, method 200 proceeds to block 225 where the turbulence detector determines if a movement of the hand is caused by a turbulent motion. Here, the turbulence detector predicts whether a movement of the hand is intended by the user or is unintended. To do so, the turbulence detector may monitor one or more sensors in the vehicle to determine if the movement of the hand or the touch screen corresponds to an acceleration or force measured by a sensor. For example, if an accelerometer disposed in the touch screen measures a force resulting from car hitting a pothole or a ship hitting a wave at the same time one of the systems shown in FIG. 3 or 4 detects a movement in the hand relative to the touch screen, the turbulence detector determines the movement of the hand was a result of the turbulent motion rather than an intended movement of the user.

In another aspect, the turbulence detector determines the rate at which the hand moved to determine if the movement resulted from the turbulent motion. For example, when selecting a button in a touch screen, a user may move her hand slower than one inch per second. However, sudden turbulent motions may cause the hand to move relative to the touch screen at rates that are greater than two inches per second. Thus, if the turbulence detector detects a rate faster than two inches per second, the detector assumes the motion was unintended and was caused by turbulent motion.

Referring to FIG. 3, in one aspect, the turbulence detector compares the output of sensor 310 to sensor 320 to determine if movement in the finger 315 is cause by turbulence motion. For example, if the output of sensor 320 indicates that the finger 315 is accelerating (i.e., moving) but the output of sensor 310 indicates that the remaining portion of the hand is stationary, the turbulence detector may determine the motion of the finger 315 is intended by the user and not caused by turbulence. However, if both sensors 310 and 320 output the same acceleration, the turbulence detector may determine that the motion of the finger 315 was caused by turbulent motion. Moreover, a similar analysis may be performed by system 400 in FIG. 4. There, the motion tracker 415 may track the motion of the finger relative to the other parts of the hand 405. If the extended finger moves differently than the other parts of the hand, the turbulence detector may determine the finger's movement was intended by the user.

In one aspect, the turbulence detector may consider multiple factors to determine whether movement of the hand is unintended. For example, the turbulence detector may consider both the rate of movement and the data provided by the sensors disposed in the vehicle to determine if the movement of the finger was intentional. In another example, the turbulence detector may use the information provided by the tracking systems 300 and 400 along with data provided by a sensor attached to the vehicle.

If the turbulence detector determines that the movement detected at block 225 was not caused by turbulent motion, method 200 proceeds to block 220 where the GUI is displayed normally. However, if the movement was caused by turbulence, method 200 proceeds to block 230 where the turbulence detector moves at least a portion of the GUI in the screen to maintain a spatial relationship between the hand and an underlying portion of the GUI. The figures and discussion that follow provide different examples of maintaining the relationship between the hand of the user and a portion of the GUI during (or after) turbulent motion.

Figure 5A:
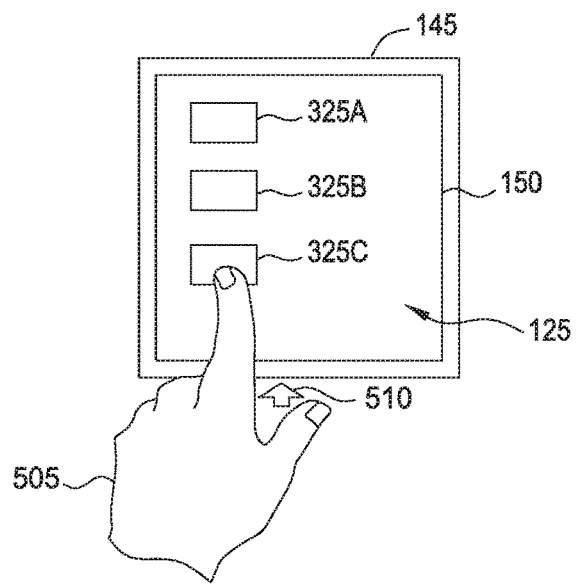
FIGS. 5A-5C illustrate a touch screen that adjusts the position of a GUI in response to turbulent motions.
Figure 5B:
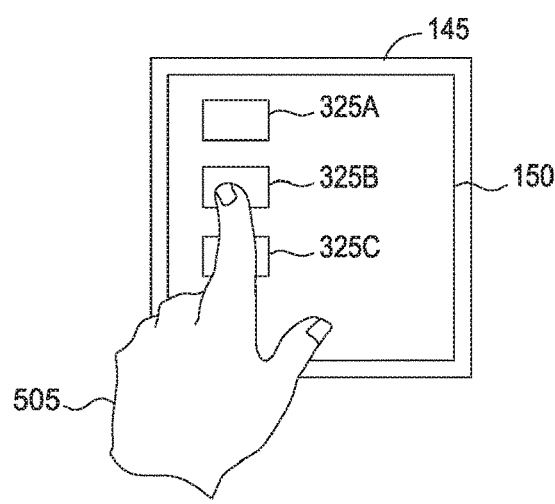
Figure 5C:
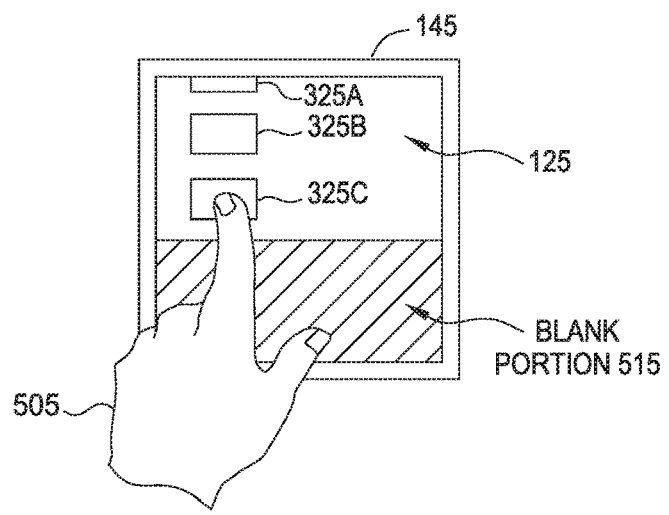

FIGS. 5A-5C illustrate touch screen 150 which adjusts the position of the GUI 125 in response to turbulent motions. As shown in FIG. 5A, a hand 505 of the user overlaps button 325C in the GUI 125. Assume here that the hand 505 is not contacting the screen 150. For example, the user may be in the process of moving her hand 505 towards the screen (i.e., in a direction into the page) in order to select the button 325C. However, before the user can contact the touch enabled screen 150 and select the button 325C, turbulent motion causes a force which causes the hand 505 (or the screen 150) to move in the direction shown by arrow 510. That is, the hand 505 moves up and away from the button 325C which is unintended by the user.

FIG. 5B illustrates the result of the turbulent motion on the spatial relationship between the hand 505 and the GUI 125 shown in FIG. 5A. Because of the violent and sudden nature of many turbulent motions, the user may not have time to adjust the position of her hand 505 to compensate for the forces applied by the turbulent motion. As shown, the turbulent motion causes the hand 505 to move up (or the screen 150 to move down) until the extended finger of the hand 505 now hovers over the button 325B. If the user continues to move her hand 505 towards the screen 150, the user will contact button 325B by mistake. That is, if the turbulent motion occurs while the user is about to contact a button in the GUI 125 (e.g., button 325C), in this example, the motion causes the user to contact the wrong button (e.g., button 325B).

FIG. 5C illustrates the result of the turbulence detector moving the GUI 125 to maintain the spatial relationship between the hand 505 and the button 325C before the turbulent motion occurred as shown in FIG. 5A. That is, the undesired spatial relationship shown in FIG. 5B is avoided. In FIG. 5C, the turbulence detector instructs the display adapter to shift the GUI 125 up such that the extended finger of the hand 505 continues to overlap the button 325C. In one aspect, the turbulence detector continually tracks the location of the hand 505 and thus can maintain the spatial relationship between the GUI 125 and the hand 505 that existed before the turbulent motion occurred. For example, once the turbulence detector determines the movement of the hand 505 relative to the screen 150 shown by arrow 510 is caused by turbulence, the turbulence detector maintains the spatial relationship between the GUI 125 and hand 505. Put differently, the turbulence detector moves the GUI 125 in a same manner as the turbulent motion changes the relative location of the hand 505 to the screen 150. Thus, whatever portion of the GUI 125 was overlapped by the hand 505 before the turbulent motion is overlapped by the hand during and after the turbulent motion.

As used herein, maintaining the spatial relationship between the hand 505 and the GUI 125 does not necessarily mean the location of the hand 505 relative to the GUI 125 does not change. For example, due to imprecisions in the tracking systems shown in FIGS. 3 and 4, the spatial relationships between the hand 505 and the GUI 125 shown in FIGS. 5A and 5C may change slightly. Moreover, because the hand 505 may move some distance before the turbulence detector determines the motion was caused by turbulent motion, the spatial relationship between the hand 505 and the GUI 125 may change slightly as a result of the turbulent motion. Nonetheless, maintaining the spatial relationship between the hand 505 and the GUI 125 still results in the interactive element that was overlapped by the hand 505 before the turbulent motion is still overlapped by the hand 505 during or after the turbulent motion.

In one aspect, once the hand is within a predefined distance from the screen (as discussed in block 215 of method 200), the turbulence detector saves the spatial relationship between the hand 505 and the GUI 125. Thus, when this spatial relationship changes because of turbulent motion, the turbulence detector can move the GUI 125 in the screen 150 so that the saved spatial relationship (which may have been lost temporarily) is maintained. Thus, maintaining the spatial relationship does not require that hand 505 always overlaps the desired portion of the GUI 125 (e.g., button 325C) during the turbulent motion. For example, the motion may be so severe that the turbulence detector cannot adjust the GUI 125 fast enough to keep the hand 505 overlapping the intended button 325C. However, once the turbulent motion lessens or stops, the turbulence detector can adjust the GUI 125 to maintain the spatial relationship between the hand 505 and the GUI 125 that was saved earlier.

In FIG. 5C, the display adapter displays a blank portion 515 in the space that was previously occupied by the GUI 125 at FIG. 5A. That is, when the turbulence detector moves the GUI 125 to maintain the spatial relationship, the display adapter can back fill the portion of the screen 150 previously occupied by the GUI 125. The blank portion 515 may be either black or some other solid color.

Figure 6A:
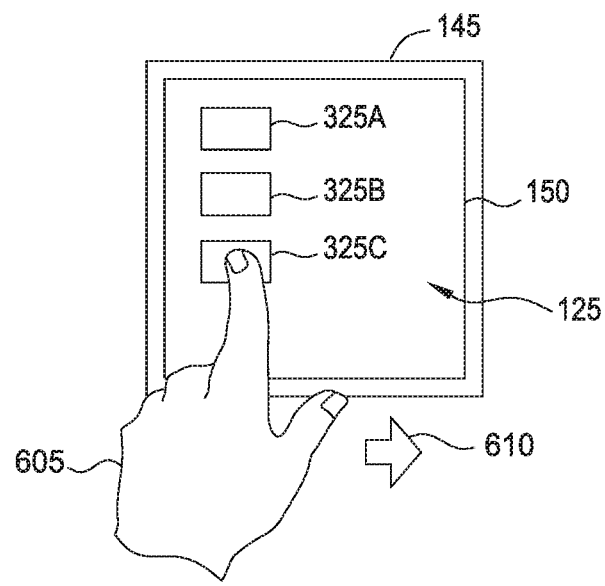
FIGS. 6A and 6B illustrate a touch screen that adjusts the position of a GUI in response to turbulent motions.
Figure 6B:
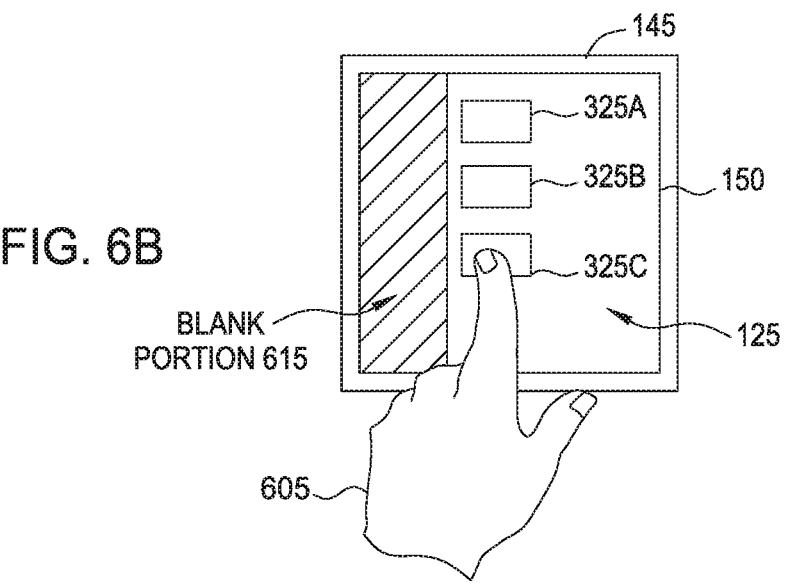

FIGS. 6A and 6B illustrate touch screen 150 which adjusts the position of a GUI 125 in response to turbulent motions. FIGS. 6A and 6B are similar to FIGS. 5A and 5C except that instead of the turbulent motion causing an upward change in the location of the hand relative to the screen 150, here, the turbulent motion causes the hand 605 (or the screen 150) to move as shown by arrow 610. As such, if not compensated for, the turbulent motion may cause the hand 605 to no longer overlap the button 325C as the user moves the hand 605 towards the screen 150.

In response to determining the motion shown by arrow 610 is caused by turbulence, the turbulence detector moves the GUI 125 as shown in FIG. 6B to maintain the spatial relationship between the hand 605 and the GUI 125. Specifically, the display adapter moves the GUI 125 to the right in the screen 150 so that the movement of the GUI 125 mirrors the movement of the hand 605. As a result, a blank portion 615 is located in the left side of the screen 150 that used to be occupied by the GUI 125. Thus, even in the presence of turbulent motion, the turbulence detector can update the position of the GUI 125 to maintain the spatial relationship between the hand 605 and the GUI 125.

Figure 7A:
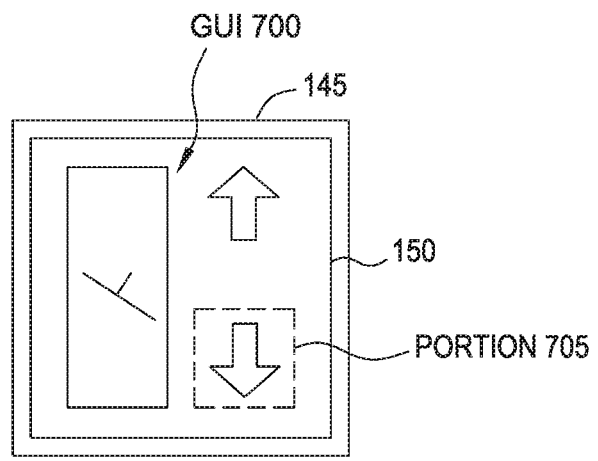
FIGS. 7A and 7B illustrate a touch screen that adjusts the position of a GUI in response to turbulent motions.
Figure 7B:
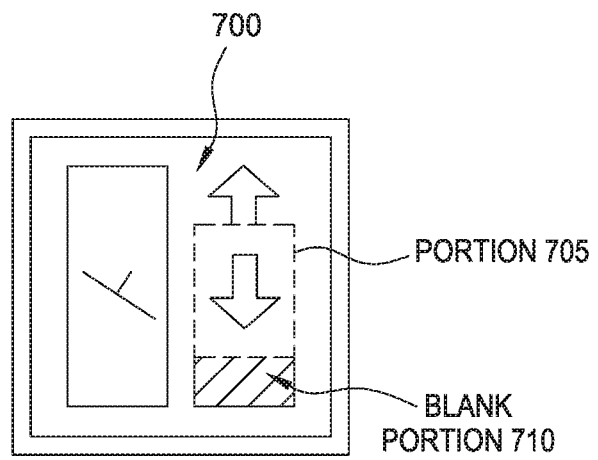

FIGS. 7A and 7B illustrate touch screen 150 which adjusts the position of a GUI 700 in response to turbulent motions. Unlike in FIGS. 5C and 6B where the turbulence detector moves the entire GUI 125, in FIGS. 7A and 7B, the turbulence detector moves only a portion of the GUI 700. For clarity, the user's hand has been omitted from FIGS. 7A and 7B but assume that the user's hand overlaps a portion 705 of GUI 700 shown by the dotted line. For example, the user may be moving her hand to touch the down arrow contained within portion 705. However, before contacting the portion 705 of the screen 150 containing the down arrow, turbulent motion causes the relative location of the user's hand to the screen 150 to change.

FIG. 7B illustrates the turbulence detector moving the portion 705 of the GUI 700 in response to the turbulent motion. In this case, the turbulent motion causes the hand to move up in the vertical direction relative to the screen 150. In response, the turbulence detector removes the portion 705 from its previous location in the screen 150 and moves portion 705 in a manner to mirror the movements of the user's hand. Thus, if the user contacts the screen 150, she will contact portion 705—i.e., the down arrow. In this example, the turbulence detector identifies a portion of the GUI 700 (i.e., portion 705), and when turbulent motion is detected, moves the already identified portion 705 within the screen 150 in order to maintain its spatial relationship with the user's hand. In this case, the portion 705 is shifted up to overlap a portion of the up arrow. As shown, moving the portion 705 creates a blank portion 710 in a space within the screen 150 previously occupied by portion 705.

One advantage of adjusting the GUI 700 as shown in FIGS. 7A and 7B is that the entire GUI is not shifted in response to turbulent motion which may be less distracting to the user. However, to move only a portion of the GUI 700 rather than the entire portion may mean the application generating the GUI (e.g., the pilot application 120 in FIG. 1) is modified to respond to turbulent motion. That is, the application may generate different GUIs in order to move around the portion 705 that corresponds to the user's hand as shown in FIG. 7B. In contrast, shifting the entire GUI as shown in FIGS. 5C and 6B may mean the underlying application is not modified.

In one aspect, in addition to moving the portion 705, the turbulence detector may also increase the size of the portion 705. That is, when moving the portion 705 from the location shown in FIG. 7A to the location in FIG. 7B, the turbulence detector expands the area of the portion 705 to make it larger which increases the likelihood the user contacts the desired button—e.g., the down arrow.

Returning to method 200, at block 230, the turbulence detector can use any of the techniques shown in FIGS. 5-7 to move at least a portion of the GUI to maintain the spatial relationship between the hand and the GUI. So long as the turbulent motion continues to move the hand and the hand is within the threshold distance of the screen, the turbulence detector moves the GUI (or a portion thereof) to mirror the movements of the hand. However, in one aspect, once the user moves her hand such that her hand is no longer within the threshold distance of the screen, the threshold detector may stop moving the GUI even if the user's hand is moved because of turbulence. In one aspect, the turbulence detector moves the GUI back into its normal (unadjusted) state. For example, the turbulence detector may instruct the display adapter to return the GUI to its original, default position as shown in FIGS. 5A, 6A, and 7A.

In the preceding paragraphs, reference is made to aspects presented in this disclosure. However, the scope of the present disclosure is not limited to specific described aspects. Instead, any combination of the preceding features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the preceding aspects, features, and advantages are merely illustrative and are not considered elements or limitations of the appended claims except where explicitly recited in a claim(s).

Aspects may take the form of an entirely hardware aspect, an entirely software aspect (including firmware, resident software, micro-code, etc.) or an aspect combining software and hardware aspects that may all generally be referred to herein as a "circuit," "module" or "system."

Aspects may be a system, a method, and/or a computer program product. The computer program product may include a computer readable storage medium (or media) having computer readable program instructions thereon for causing a processor comprising hardware and software to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices comprising hardware and software from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present aspects may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects disclosed herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to aspects, other and further aspects may be devised without departing from the basic scope thereof, and the scope thereof is determined by the claims that follow.

What is claimed is:
1. A method comprising:
  displaying a graphical user interface (GUI) on a touch screen mounted in a vehicle;
  detecting a turbulent event affecting the touch screen and a user in the vehicle;
  tracking movement of a body part of the user before the turbulent event to identify a spatial relationship between the body part and an interactive element having a predefined location within the GUI displayed on the touch screen, wherein the location of the interactive element can be changed only after detecting the turbulent event;

identifying a change in location of the body part relative to the interactive element during the turbulent event;

determining, before the body part contacts the touch screen, whether the change in location of the body part was one of an intended motion made by the user during the turbulent event and an unintended motion caused by the turbulent event; and moving, in response to determining that the change in location of the body part was due to the unintended motion and before the body part contacts the touch screen, the location of the interactive element within the touch screen to maintain the spatial relationship between the body part and the interactive element before the turbulent event.

2. The method of claim 1, wherein the body part of the user does not contact the touch screen when identifying the spatial relationship and when moving the position of the GUI.

3. The method of claim 1, wherein identifying the spatial relationship comprises:

tracking the body part of the user to identify the location of the body part relative to the interactive element before the user contacts the touch screen.

4. The method of claim 3, wherein tracking the body part of the user comprises:

receiving sensor data from a wearable device on the body part of the user, wherein the sensor data is processed to identify the change in the location of the body part relative to the interactive element.

5. The method of claim 1, further comprising:

determining whether the body part is within a threshold distance from the touch screen, wherein the location of the body part is tracked both when the body part is within the threshold distance and outside the threshold distance, wherein the position of the interactive element is moved to maintain the spatial relationship only when the body part is within the threshold distance.

6. The method of claim 1, wherein the position of the interactive element is moved to maintain the spatial relationship only when the change in location of the body part was caused by the turbulent event.

7. The method of claim 1, wherein moving the position of the interactive element to maintain the spatial relationship comprises:

shifting an entire portion of the GUI displayed within the touch screen to mirror movements of the body part of the user relative to the touch screen; and back filling a portion of the touch screen that was previously occupied by the GUI.

8. The method of claim 1, further comprising:

identifying a second change in location of the body part relative to the interactive element during a second turbulent event;

determining that the second change in location of the body part was an intended motion made by the user during the turbulent event; and maintaining a position of the interactive element at a previous location before the second turbulent event.

9. A display system, comprising:

a touch screen configured to be mounted in a vehicle and to display a GUI; and a turbulence detector configured to:

detect a turbulent event affecting the touch screen and a user in the vehicle;

track movement of a body part of the user before the turbulent event to identify a spatial relationship between the body part and an interactive element having a predefined location within the GUI displayed on the touch screen, wherein the location of the interactive element can be changed only after detecting the turbulent event;

identify a change in location of the body part relative to the interactive element during the turbulent event;

determine, before the body part contacts the touch screen, whether the change in location of the body part was one of an intended motion made by the user during the turbulent event and an unintended motion caused by the turbulent event; and move, in response to determining that the change in location of the body part was due to the unintended motion and before the body part contacts the touch screen, the location of the interactive element within the touch screen to maintain the spatial relationship between the body part and the interactive element before the turbulent event.

10. The display system of claim 9, wherein the body part of the user does not contact the touch screen when identifying the spatial relationship and when moving the position of the GUI.

11. The display system of claim 9, wherein the turbulence detector is configured to:

track the body part of the user to identify the location of the body part relative to the interactive element before the user contacts the touch screen.

12. The display system of claim 11, wherein the turbulence detector is configured to:

receive sensor data from a wearable device on the body part of the user to identify the change in the location of the body part relative to the interactive element.

13. The display system of claim 9, wherein the turbulence detector is configured to:

determine whether the body part is within a threshold distance from the touch screen, wherein the position of the interactive element is moved to maintain the spatial relationship only when the body part is within the threshold distance.

14. The display system of claim 9, wherein the position of the interactive element is moved to maintain the spatial relationship only when the change in location of the body part was caused by the turbulent event.

15. The display system of claim 9, wherein the turbulence detector is configured to:

shift an entire portion of the GUI displayed within the touch screen to mirror movements of the body part of the user relative to the touch screen; and back fill a portion of the display that was previously occupied by the GUI.

16. A computer readable storage medium comprising:

computer-readable program code embodied therewith, the computer-readable program code executable by one or more computer processors to:

display a GUI on a touch screen mounted in a vehicle;

detect a turbulent event affecting the touch screen and a user in the vehicle;

track movement of a body part of the user before the turbulent event of the vehicle to identify a spatial relationship between the body part and an interactive element having a predefined location within the GUI displayed on the touch screen, wherein the location of the interactive element can be changed only after detecting the turbulent event;

identify a change in location of the body part relative to the interactive element during the turbulent event;

determine, before the body part contacts the touch screen, whether the change in location of the body part was one of an intended motion made by the user during the turbulent event and an unintended motion caused by the turbulent event; and move, in response to determining that the change in location of the body part was due to the unintended motion and before the body part contacts the touch screen, the location of the interactive element within the touch screen to maintain the spatial relationship between the user and the interactive element before the turbulent event.

17. The computer readable storage medium of claim 16, wherein the body part of the user does not contact the touch screen when identifying the spatial relationship and when moving the position of the GUI.

18. The computer readable storage medium of claim 17, wherein identifying the spatial relationship comprises computer-readable program code executable to:

track the body part of the user to identify the location of the body part relative to the interactive element before the user contacts the touch screen.

19. The computer readable storage medium of claim 18, wherein tracking the body part of the user comprises computer-readable program code executable to:

receive sensor data from a wearable device on the body part of the user, wherein the sensor data is processed to identify the change in the location of the body part relative to the interactive element.

20. The computer readable storage medium of claim 17, wherein the computer-readable program code is further executable to:

determine whether the body part is within a threshold distance from the touch screen, wherein the position of the interactive element is moved to maintain the spatial relationship only when the body part is within the threshold distance.

\* \* \* \* \*